US011087924B2

(12) United States Patent
Kessler

(10) Patent No.: US 11,087,924 B2
(45) Date of Patent: Aug. 10, 2021

(54) CAPACITOR, PARTICULARLY INTERMEDIATE CIRCUIT CAPACITOR FOR A MULTIPHASE SYSTEM

(71) Applicant: Robert Bosch GmbH, Stuttgart (DE)

(72) Inventor: Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 16/463,416

(22) PCT Filed: Oct. 4, 2017

(86) PCT No.: PCT/EP2017/075144
§ 371 (c)(1),
(2) Date: May 23, 2019

(87) PCT Pub. No.: WO2018/095623
PCT Pub. Date: May 31, 2018

(65) Prior Publication Data

US 2021/0110973 A1 Apr. 15, 2021

(30) Foreign Application Priority Data

Nov. 24, 2016 (DE) ..................... 10 2016 223 256.8

(51) Int. Cl.
*H01G 2/22* (2006.01)
*H01G 4/005* (2006.01)
*H01G 4/38* (2006.01)

(52) U.S. Cl.
CPC ............... *H01G 2/22* (2013.01); *H01G 4/005* (2013.01); *H01G 4/38* (2013.01)

(58) Field of Classification Search
None
See application file for complete search history.

(56) References Cited

U.S. PATENT DOCUMENTS 5,388,028 A 2/1995 Arbanas
6,933,805 B1 8/2005 Norte et al.
(Continued)

FOREIGN PATENT DOCUMENTS

CN 101432829 A 5/2009
CN 101981638 A 2/2011
(Continued)

OTHER PUBLICATIONS

International Search Report for Application No. PCT/EP2017/075144 dated Jan. 23, 2018 (English Translation, 2 pages).

*Primary Examiner* — Dion Ferguson
(74) *Attorney, Agent, or Firm* — Michael Best & Friedrich LLP

(57) ABSTRACT

The invention relates to a capacitor (1), particularly an intermediate circuit capacitor for a multiphase system, with a first voltage layer (11) and a second voltage layer (21), the first voltage layer (11) and the second voltage layer (21) forming an overlapping region (4) in which the first voltage layer (11) and the second voltage layer (21) are parallel to each other and arranged directly one above the other, at a distance from each other by means of a gap (5), on a base side (6) of the capacitor (1), with at least one capacitor structure (3) comprising at least one dielectric (2), arranged on an upper side (13) of the first voltage layer (11), facing away from the second voltage layer (21), the first voltage layer (11) being in electroconductive contact with a first terminal (15) of the capacitor structure (3) and the second voltage layer (21) being in electroconductive contact with a second terminal (25) of the capacitor structure (3) by means of a contacting element (30). According to the invention, the first voltage layer (11) has at least one recess (14) through which the contacting element (30) is guided.

12 Claims, 3 Drawing Sheets

(56) References Cited

U.S. PATENT DOCUMENTS

| | | | | |
|---|---|---|---|---|
| 9,236,189 | B2 | 1/2016 | Oh et al. | |
| 2010/0155158 | A1* | 6/2010 | Azuma | B60K 6/28<br>180/65.8 |
| 2012/0139483 | A1 | 6/2012 | Cottet | |
| 2013/0033913 | A1* | 2/2013 | Sparka | H01G 4/228<br>363/132 |
| 2013/0335881 | A1* | 12/2013 | Atsumi | H01G 2/04<br>361/303 |
| 2017/0062132 | A1* | 3/2017 | Weissenborn | H01G 4/385 |
| 2017/0207027 | A1* | 7/2017 | Sato | H01G 2/04 |
| 2018/0342354 | A1* | 11/2018 | Imamura | H01G 4/228 |

FOREIGN PATENT DOCUMENTS

| | | | |
|---|---|---|---|
| CN | 202307542 | U | 7/2012 |
| CN | 202394720 | U | 8/2012 |
| DE | 102013216941 | | 2/2015 |
| DE | 202015004662 | U1 | 10/2015 |
| JP | 2005005467 | | 1/2005 |
| JP | 2010258343 | | 11/2010 |
| JP | 2011023674 | A | 2/2011 |
| JP | 2016139778 | | 8/2016 |
| WO | 2005022572 | A1 | 3/2005 |

* cited by examiner

CAPACITOR, PARTICULARLY INTERMEDIATE CIRCUIT CAPACITOR FOR A MULTIPHASE SYSTEM

BACKGROUND OF THE INVENTION

The invention relates to a capacitor, particularly an intermediate circuit capacitor for a polyphase system.

In power electronics, a plurality of electrical networks is coupled in terms of energy on a common DC voltage plane via electrical capacitors in an intermediate circuit of converters. Owing to the repeated occurrence of switching operations, frequency-dependent high power losses occur as a result of the alternating currents in the phases. It is known that, owing to flat current conduction and owing to the magnetic interaction between the current layers effected with an opposite direction of current flow, a marked reduction in the inductance resulting from the interconnection and therefore markedly reduced power losses result.

SUMMARY OF THE INVENTION

In accordance with the invention, a capacitor, particularly an intermediate circuit capacitor for a polyphase system, comprising a first voltage layer and a second voltage layer is proposed. The first voltage layer and the second voltage layer form a region of overlap, in which the first voltage layer and the second voltage layer are arranged parallel to one another and directly one above the another, spaced apart from one another by a gap, on a base side of the capacitor. Furthermore, the capacitor comprises at least one capacitor structure, which has at least one dielectric and is arranged on an upper side of the first voltage layer, said upper side being remote from the second voltage layer, wherein the first voltage layer is in electrically conductive contact with a first terminal of the capacitor structure, and the second voltage layer is in electrically conductive contact with a second terminal of the capacitor structure by means of a contact-making element. In accordance with the invention, the first voltage layer has at least one cutout, through which the contact-making element has been passed.

The capacitor according to the invention has the advantage over the prior art that, owing to the parallel guidance of the first voltage layer and the second voltage layer in the region of overlap, a very low-inductance connection can be achieved along the capacitor. Owing to the planar-parallel guidance of the surfaces on the base side of the capacitor and the opposite direction of current flow, the current paths in the voltage layers are guided close to one another. The effects caused by magnetic coupling of the magnetic fields of conductors lying close next to one another, which effects can result in high losses, are advantageously compensated for by the current paths guided one above the other with an opposite direction of current flow. Owing to this advantageously low-inductance design technology, in which firstly, for example, the first voltage layer overlaps with the second voltage layer on the base side of the capacitor and secondly, for example, the voltage layers overlap with the capacitor structure or the capacitor structures, the total inductance of the capacitor is markedly reduced, which results in advantageously low losses. The contributions to the losses of the first voltage layer and the second voltage layer owing to skin effects and proximity effects are reduced by the capacitor according to the invention. Skin effects result in the current density in the interior of electrical conductors through which alternating current flows being lower than in the external regions. Proximity effects result in current constrictions or current displacements between conductors which are close next one another in the case of alternating currents. Thus, with the reduction in the parasitic inductance of the capacitor, when using the capacitor as an intermediate circuit capacitor, for example, the demands on the switching semiconductor switches can also advantageously be reduced. Furthermore, the electromagnetic compatibility of the design with respect to other component parts is advantageously improved.

In addition, the capacitor according to the invention can advantageously be used as a polyphase capacitor in intermediate circuits. Thus, for 6-phase systems, for example, all phases can be connected to the capacitor according to the invention instead of two 3-phase capacitors being connected via a busbar, which can result in oscillatory CLC systems excited on every switching operation of an inverter phase even in the case of very low inductance values. Since the polarity of all of the phase terminals is maintained with the capacitor according to the invention, advantageously all of the terminals can be designed to be identical in pairs.

In addition, the capacitor having the features of the independent claim has the advantage that the first voltage layer and the second voltage layer of the capacitor, which layers are arranged directly one above the other on a base side of the capacitor, can advantageously be cooled when the base side is positioned on a cooling apparatus, such as a heat sink, for example. This represents particularly simple cooling both of the first voltage layer and of the second voltage layer and of the capacitor structure arranged on the upper side of the first voltage layer. Owing to the simultaneous cooling of the first voltage layer and the second voltage layer, the entire complexity involved in the removal of heat for the capacitor is thus advantageously reduced. Furthermore, heat losses advantageously produced in the first voltage layer or the second voltage layer as a result of switching processes, for example, can thus advantageously also be dissipated, for example, via a cooling apparatus arranged on the base side of the capacitor. By virtue of such cooling of the capacitor on the base side of the capacitor, the heat introduced into the, for example, heat-sensitive capacitor structure can thus advantageously be reduced, with the result that heat-sensitive capacitor structures can also be used, for example.

In a particularly advantageous exemplary embodiment, apart from the at least one capacitor structure, at least one further capacitor structure having a further first terminal and a further second terminal is provided, which at least one further capacitor structure is arranged on the upper side of the first voltage layer. In this case, the further first terminal of the further capacitor structure is in electrically conductive contact with the first voltage layer, and the further second terminal of the further capacitor structure is in electrically conductive contact with the second voltage layer by means of the contact-making element, wherein a side region of the contact-making element is arranged at least partially between the capacitor structure and the further capacitor structure.

Particularly advantageously, the side region of the contact-making element is flat. Thus, side regions of the contact-making element can advantageously, for example, act as separating walls between a plurality of capacitor structures, and heat can advantageously be dissipated to the second voltage layer and therefore the base side of the capacitor via flat side regions of the contact-making element. Owing to flat side regions of the contact-making element, the contact-making element can overlap with the capacitor structure or the capacitor structures in an advantageously large region, as a result of which the total inductance and the losses in the capacitor can advantageously be reduced further.

In an advantageous exemplary embodiment, the side region of the contact-making element is arranged substantially perpendicular to the first voltage layer and the second voltage layer. Thus, good receptacles for capacitor structures can advantageously be formed, which enable secure arrangement of the capacitor structures in the capacitor with a compact design of the capacitor.

Particularly advantageously, a flat top region is formed on the contact-making element, wherein the capacitor structure is arranged between the flat top region and the first voltage layer. A flat top region of the contact-making element, which may also be formed parallel to the first voltage layer, for example, results in the advantage that the total inductance of the capacitor can advantageously be reduced further and thus losses can be minimized. In addition, the capacitor structures can advantageously be protected.

In an advantageous exemplary embodiment, the flat top region of the contact-making element overlaps with the first voltage layer and/or with the second voltage layer. Thus, the total inductance of the capacitor can advantageously be reduced further.

Advantageously, at least one connecting element is formed on the side region, said connecting element protruding through the cutout, wherein the connecting element has a smaller width of the connecting element than a width of the side region. Thus, the cutout in the first voltage layer can advantageously be designed to be small, and therefore the areal extent of the first voltage layer and therefore the region of overlap can advantageously have a large area despite the cutout. This results in an advantageously large region of overlap between the first voltage layer and the second voltage layer and therefore in an advantageously reduced inductance of the capacitor.

Advantageously, a plurality of connecting elements is provided on the side region, wherein in each case one connecting element protrudes through in each case one cutout in the first voltage layer. As a result of a plurality of connecting elements which protrude through a plurality of cutouts, for example, a stable connection can be produced between the contact-making element and the second voltage layer.

It has proven to be advantageous if the at least one connecting element is in the form of a pin and is plugged into at least one opening in the second voltage layer and/or is welded to the second voltage layer. In this way, the contact-making element can advantageously be fitted easily on the second voltage layer by virtue of the connecting element and can be fastened to said connecting element easily and in a stable manner.

If the contact-making element comprises a further side region, wherein the side region and the further side region are arranged on opposite sides of the capacitor structure, the advantage results whereby a side region is provided on the two opposite sides of the capacitor structure, which can also be used as a stable and compact receptacle for the capacitor structure. The capacitor structure can advantageously be pushed in between the two side regions of the contact-making element easily, for example during manufacture. The capacitor structure can thus be inserted in the receptacle and in this way advantageously adjusted and protected. Therefore, the capacitor is advantageously compact and provides an advantageous receptacle for a multiplicity of standard capacitor structures and therefore proves itself to be particularly advantageous in applications which require a connection of a plurality of capacitor structures. Furthermore, heat produced in capacitor structures can advantageously be dissipated via the two opposite sides and those side regions of the contact-making element which are arranged on the two opposite sides.

It has proven to be advantageous if the capacitor comprises at least one first pole terminal for making contact with the first voltage layer and at least one second pole terminal for making contact with the second voltage layer, wherein the at least one first pole terminal extends beyond the region of overlap as a lateral continuation of the first voltage layer and, parallel thereto, the at least one second pole terminal extends beyond the region of overlap as a lateral continuation of the second voltage layer, and said at least one first pole terminal and said at least one second pole terminal thus form at least one contact-making pair of lugs protruding on the base side of the capacitor. By virtue of such a contact-making pair of lugs, the pole terminals can be particularly inexpensive and can also easily be formed integrally with the second surface electrode or the first voltage layer, for example.

Furthermore, it has proven to be advantageous if the first voltage layer completely surrounds the contact-making element peripherally in the region of the cutout.

BRIEF DESCRIPTION OF THE DRAWINGS

Exemplary embodiments of the invention are illustrated in the drawing and will be explained in more detail in the description below. In the drawing.

DETAILED DESCRIPTION

Figure 1:
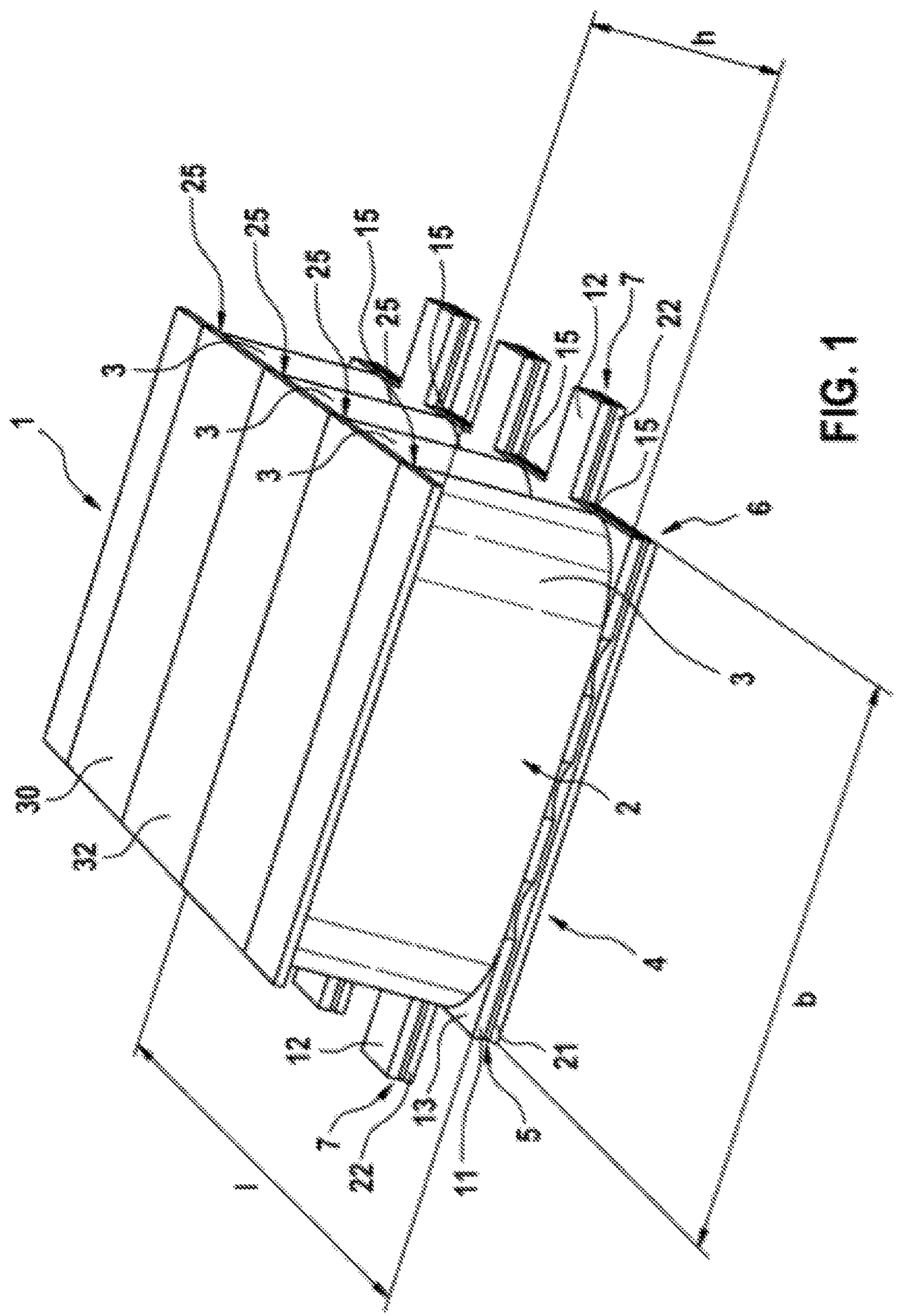
FIG. 1 shows a first view of a schematic illustration of an exemplary embodiment of the capacitor according to the invention.

FIG. 1 shows a schematic illustration of an exemplary embodiment of the capacitor 1 according to the invention. The capacitor 1 comprises a first voltage layer 11 and a second voltage layer 21. The first voltage layer 11 and the second voltage layer 21 form a region of overlap 4, in which the first voltage layer 11 and the second voltage layer 21 are arranged parallel to one another and directly one above the other, spaced apart from one another by a gap 5, on a base side 6 of the capacitor 1. The voltage layers 11, 21 are manufactured from an electrically conductive material such as metal, for example, such as copper, for example. The voltage layers 11, 21 can be flat and can be manufactured from metal sheets, for example. The first voltage layer 11 and the second voltage layer 21, as in this exemplary embodiment, can have substantially, i.e. apart from the cutouts 14 provided in the first voltage layer 11, the same areal extent. Thus, optimized guidance of the current paths one above the other can be ensured, and the total inductance of the capacitor 1 can advantageously be reduced and the electromagnetic compatibility improved. The first voltage layer 11 has an upper side 13, which is remote from the second voltage layer 21.

In the context of the present application, an object is understood to mean the first voltage layer 11, the second voltage layer 21 or a pole terminal 12, 22. If a first object is arranged partially directly beneath or partially directly above a second object or the first object and the second object are arranged directly one above the other, in the context of the present application this should be understood to mean that the first object and the second object are arranged relative to one another such that a perpendicular projection of the first object onto a projection plane arranged planer-parallel with respect to the second object and a perpendicular projection of the second object onto the projection plane have at least one point of intersection.

In this exemplary embodiment, the capacitor 1 furthermore comprises four capacitor structures 3, each having at least one dielectric 2. A capacitor structure 3 in the context of the present application is understood to mean a structure which, together with the first voltage layer 11 and the second voltage layer 21, can form a capacitor or which itself forms a capacitor. Each of the capacitor structures 3 has at least one first terminal 15 and at least one second terminal 25. Electrical contact can be made with the capacitor structures 3 by means of the terminals 15, 25. In this exemplary embodiment, each of the capacitor structures 3 is in electrically conductive contact with the first voltage layer 11 via the in each case first terminal. The second terminal 25 of each capacitor structure 3 is in electrically conductive contact with the second voltage layer 21 by means of a contact-making element 30. The capacitor structure 3 may be a dielectric 2, for example, with the result that the first voltage layer 11, together with the contact-making element 30 and the dielectric 2, can form a capacitor. However, the capacitor structure 3 can also consist of one or more capacitors which are arranged on the upper side 13 of the first voltage layer 11 and, depending on the intended use, can be connected in parallel or in series. In this case, capacitor technologies other than capacitors can also be used, such as, for example, stack capacitors, round-winding capacitors or flat-winding capacitors. For example, a capacitor structure 3 and a further capacitor structure 3, which is likewise included in the capacitor 1, can have the same structural form. In the exemplary embodiment shown in FIG. 1, all of the capacitor structures 3 are structurally identical, i.e. the capacitor 1 in this exemplary embodiment comprises four structurally identical capacitor structures 3.

The capacitor structures 3 in this exemplary embodiment are arranged next to one another. However, the capacitor structures 3 can also be arranged one behind the other and/or one above the other and/or next to one another, for example. Any desired number of capacitor structures 3 can be provided for the capacitor 1. The total arrangement of the capacitor structures 3 in this case has a length l, a width b and a height h. The height h in this case is measured perpendicular to the first voltage layer 11, whereas the width b and the length l are measured parallel to the first voltage layer 11. In this exemplary embodiment, the height h of the capacitor structures 3 is smaller than the width b of the capacitor structures 3. The height h of the capacitor structures 3 is smaller than the length I of the capacitor structures 3. In this exemplary embodiment, therefore, overall a flat capacitor 1 results. If the capacitor 1 on the base side 6 is arranged on a heat sink, for example, heat can be dissipated out of the first voltage layer 11 and out of the second voltage layer 11 over an advantageously large area to the heat sink.

The first voltage layer 11 extends, for example, over the entire length l of the capacitor structures 3 and over the entire width b of the capacitor structures 3. The second voltage layer 11 extends, for example, over the entire length l of the capacitor structures 3 and over the entire width b of the capacitor structures 3. The voltage layers 11, 21 can also be designed to be multilayered, for example. For example, cutouts (not illustrated in the figures) can also be formed in the voltage layers 11, 21.

Figure 2:
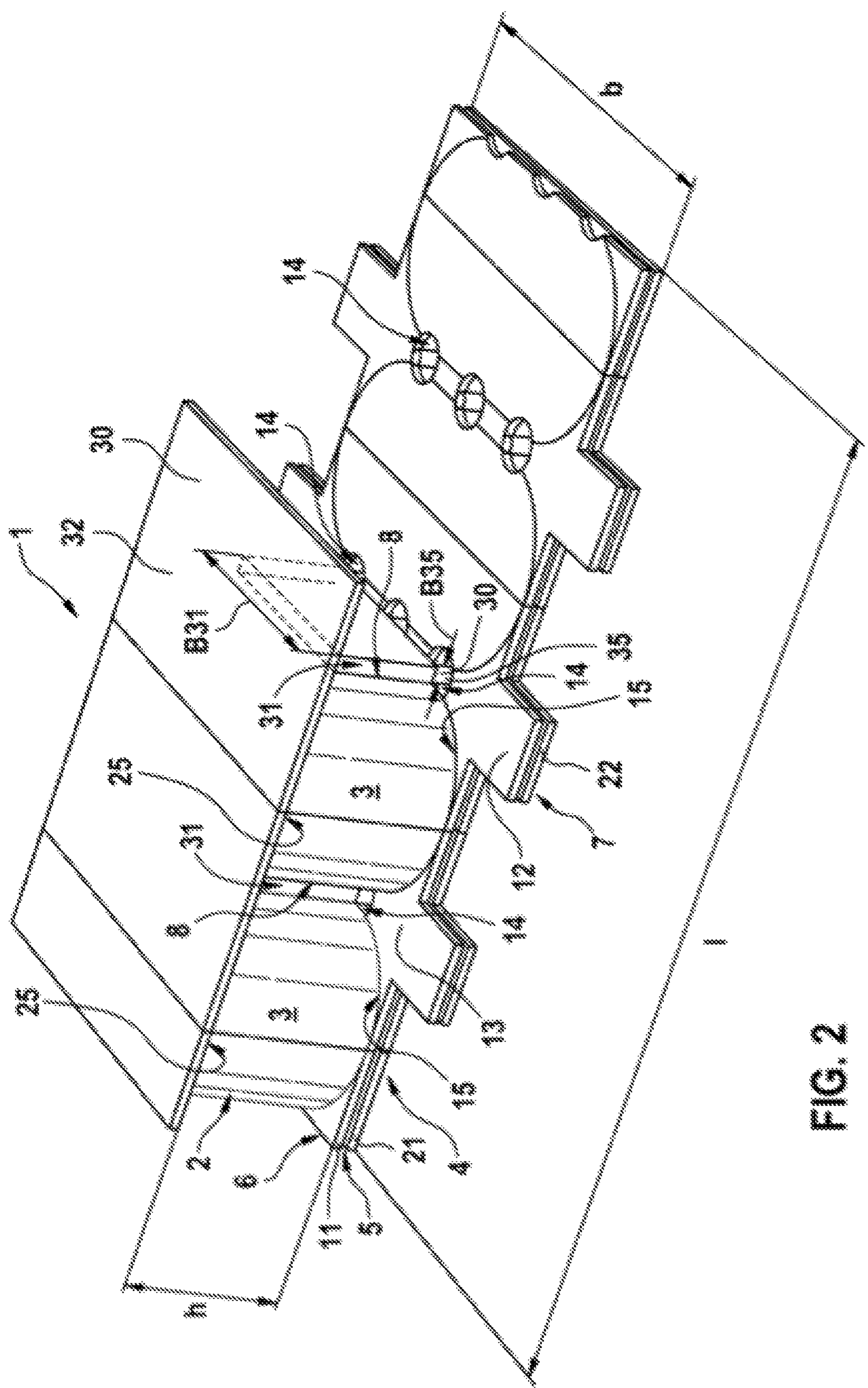
FIG. 2 shows a second view of a schematic illustration of the exemplary embodiment of the capacitor according to the invention from FIG. 1.
Figure 3:
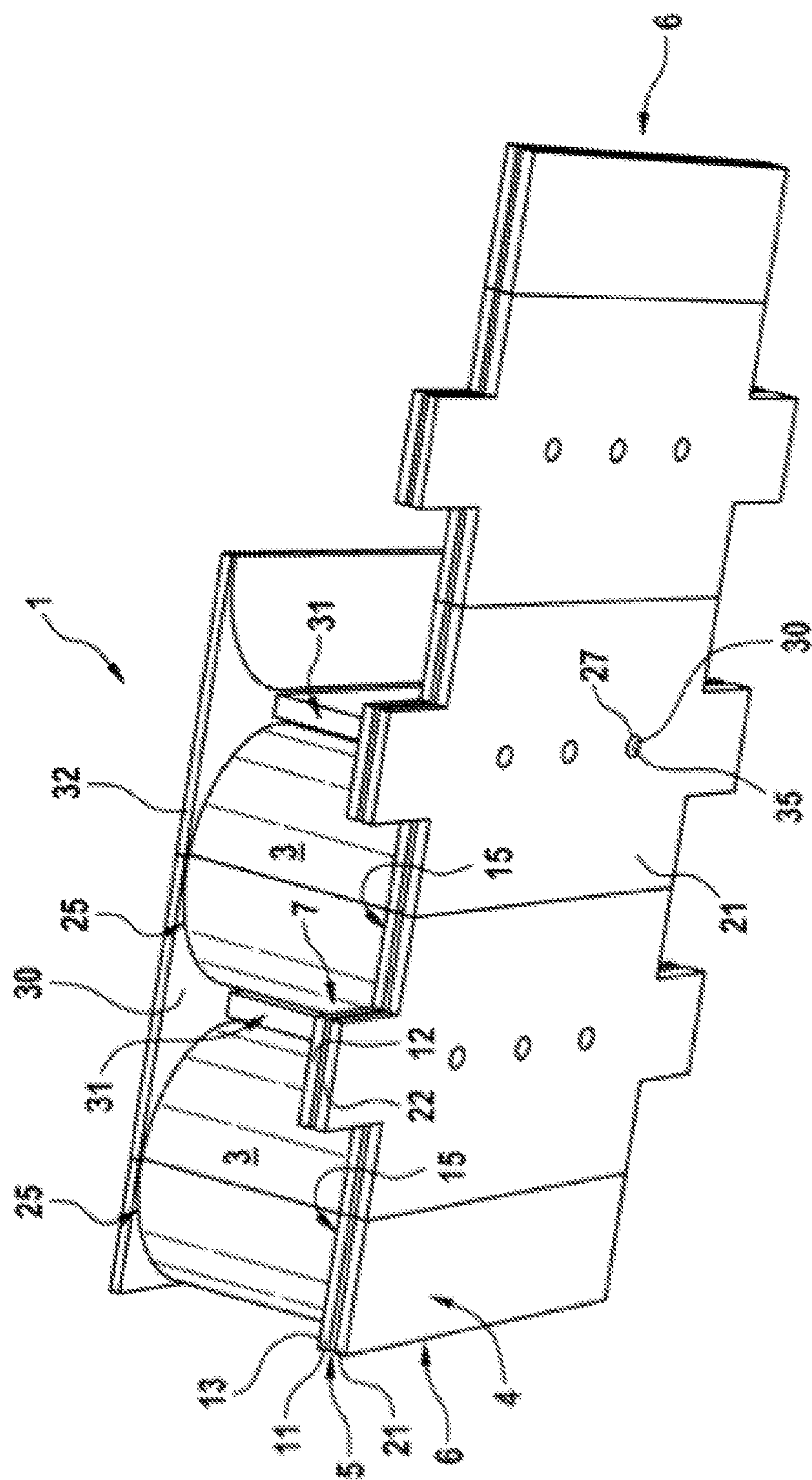
FIG. 3 shows a third view of a schematic illustration of the exemplary embodiment of the capacitor according to the invention from FIG. 1.

The second voltage layer 21 in this exemplary embodiment is in electrically conductive contact with the second terminals 15 of the capacitor structure 3 by means of a contact-making element 30. As is illustrated in FIG. 2 using a section through the exemplary embodiment, the first voltage layer 11 of the capacitor 1 has cutouts 14. The contact-making element 30 is passed through the cutout 14 in order to make electrical contact with the second voltage layer 21. The contact-making element 30 is passed through the cutout 14 in the first voltage layer 11 from the second voltage layer 21 to the second terminal 25 of the capacitor structure 3. The first voltage layer 11 completely surrounds the contact-making element 30 peripherally in the regions of the cutouts 14.

The contact-making element 30 in this exemplary embodiment has side regions 31. In this exemplary embodiment, a side region 31 of the contact-making element 30 is arranged between a capacitor structure 3 and a further capacitor structure 3. In this exemplary embodiment, the side regions 31 of the contact-making element 30 are flat. The side regions 31 of the contact-making element 30 in this exemplary embodiment therefore form separating walls between the individual capacitor structures 3. A side region 31 of the contact-making element 30 and a further side region 31 of the contact-making element 30 in this exemplary embodiment are arranged on opposite sides 8 of the capacitor structure 3. The side region 31 of the contact-making element 30 and the further side region 31 of the contact-making element 30, which are arranged on opposite sides 8 of the capacitor structure 3, therefore form, in this exemplary embodiment, together with the top region 32 of the contact-making element 30 and the first voltage layer 11, a receptacle for a capacitor structure 3 arranged between the side region 31 and the further side region 31. In this exemplary embodiment, the side regions 31 of the contact-making element 30 are arranged substantially perpendicular to the first voltage layer 11 and the second voltage layer 21. In other words, in this exemplary embodiment, the flat side regions 31 of the contact-making element 30 are positioned substantially perpendicularly on the first voltage layer 11 and on the second voltage layer 21.

Furthermore, in this exemplary embodiment, a flat top region 32 is formed on the contact-making element 30. The capacitor structures 3 are in this case arranged between the flat top region 32 and the first voltage layer 11. The flat top region 32 is therefore opposite the first voltage layer 11, and the capacitor structures 3 are arranged in an interspace between the first voltage layer 11 and the top region 32. The flat top region 32 in this exemplary embodiment is arranged parallel to the first voltage layer 11. The first voltage layer 11 in this exemplary embodiment forms, together with the side region 31 of the contact-making element 30 and the top region 32 of the contact-making element, so to speak receptacles for the capacitor structures 3. In this exemplary embodiment, the flat top region 32 of the contact-making element 30 overlaps with the first voltage layer 11 and with the second voltage layer 21.

The flat top region 32 and the first voltage layer 11, as in this exemplary embodiment, can have substantially, i.e. apart from the cutouts 14 provided in the first voltage layer 11 or cutouts provided in the top region, the same areal extent. Thus, optimized guidance of the current paths one above the other can be ensured, and the total inductance of the capacitor 1 can advantageously be reduced and the electromagnetic compatibility improved.

For example, connecting elements 35 which protrude through the cutouts 14 are formed on the side region 31 of the contact-making element 30. In this case, in this exemplary embodiment, the connecting elements 35 have a smaller width B35 of the connecting element 35 than a width B31 of the side region 31. The width B31 of the side region 31 and the width B35 of the connecting element 35 are measured parallel to the first voltage layer 11 along the flat extent of the side region 31. Thus, in this exemplary embodiment, in each case a plurality of, in this exemplary embodiment in each case three, connecting elements 35 are formed on the flat side regions 31. The connecting elements 35 are formed as a lateral extension of the side regions 31, for example. In this exemplary embodiment, a cutout 14 is provided in the first voltage layer 11 for each of the connecting elements 35 of the contact-making element 30. Thus, in this exemplary embodiment, each individual connecting element 35 is passed through a single cutout 14 in the first voltage layer 11, and the first voltage layer 11 completely surrounds a connecting element 35 peripherally in each region of a cutout 14. The cutouts 14 can be formed, for example, so as to be complimentary to the connecting element 35, as in this exemplary embodiment. The connecting elements 35 are passed through the cutouts 14 in the first voltage layer 11 without being in contact with the first voltage layer 11. The connecting elements 35 are electrically conductively insulated from the first voltage layer 11. The connecting elements 35 produce an electrically conductive connection between the side regions 31 of the contact-making element 30 and the second voltage layer 21. The connecting elements 35 are in the form of pins, for example. Thus, the connecting elements 35 can be plugged into openings 27 formed in the second voltage layer 21, for example, and can also be welded there to the second voltage layer 21, for example.

In this exemplary embodiment, the contact-making element 30 is thus formed integrally and comprises the top region 32, the side regions 31 and the connecting elements 35. The contact-making element 30 is manufactured from the electrically conductive material, for example a metal, such as copper, for example.

Furthermore, the capacitor 1 comprises at least one first pole terminal 12 for making electrical contact with the first voltage layer 11 and at least one second pole terminal 22 for making electrical contact with the second voltage layer 21. The first pole terminal 12 is formed integrally with the first voltage layer 11, for example. The second pole terminal 22 is formed integrally with the second voltage layer 21, for example. Thus, in this exemplary embodiment, as illustrated in FIG. 1, the at least one first pole terminal 12 extends as a lateral continuation of the first voltage layer 11. In this exemplary embodiment, the second pole terminal 22 extends as a lateral continuation of the second voltage layer 21. The first pole terminal 12 and the second pole terminal 22 in this exemplary embodiment form a contact-making pair of lugs 7 protruding on the base side 6 of the capacitor 1. In this case, in this exemplary embodiment, the first pole terminal 12 is formed in a plane of extent of the first voltage layer 11, and the second pole terminal 22 is formed in a plane of extent of the second voltage layer 21. As illustrated in the figures, in this exemplary embodiment six identical first pole terminals 12 and six identical second pole terminals 22 are provided. The first pole terminals 12 and the second pole terminals 22 in this case form, for example, a contact-making pair of lugs 7, in each case in pairs. In the exemplary embodiment described in this application, the capacitor 1 has six contact-making pairs of lugs 7. Furthermore, however, another number of contact-making pairs of lugs 7 can also be formed, and the contact-making pairs of lugs 7 can be arranged at different points on the capacitor 1. The total number of pole terminals is directly, for example, a multiple of three, five or six. The first pole terminal 12 and the at least one second pole terminal 22, as in this exemplary embodiment, can have the same areal extent. Thus, optimized guidance of the current paths one above the other up to the pole terminals 12, 22 can be ensured, the total inductance of the capacitor 1 is reduced and the electromagnetic compatibility is improved. In this exemplary embodiment, the first pole terminal 12 is arranged at least partially directly above or at least partially directly below the at least one second pole terminal 22. The first pole terminal 12 can also be arranged, for example, laterally offset with respect to the second pole terminal 22, however.

Cutouts or windows (not illustrated in the figures) can also be provided, for example, in the second voltage layer 21 in the region of overlap 4, through which cutouts or windows the first voltage layer 11 is accessible and the first voltage layer 11 can be connected, for example welded, to the capacitor structures 3, for example.

The first voltage layer 11, the second voltage layer 21 and the contact-making element 30 are all manufactured from the same material, for example, from the same metal, for example. The second voltage layer 21 is electrically conductively connected to the contact-making element 30 and is electrically insulated from the first voltage layer 11. For example, the capacitor 1 can be potted such that a layer of insulation consisting of potting compound is arranged in the gap 5 and in other interspaces between the first voltage layer 21 and the second voltage layer 22 with the contact-making part 30. The voltage layers 11, 21 and the top region 32 of the contact-making element 30 in this exemplary embodiment are in the form of plates, for example. In principle, at least slight deviations from the plate shape may also be used, however, for the voltage layers 11, 21 and the top region 32 of the contact-making element 30.

In the capacitor 1, current can flow from a first pole terminal 12 via the first voltage layer 11 and the first terminal 1 to the capacitor structure 3 or current can flow in the opposite direction from the capacitor structure 3 via the first terminal 1 and the first voltage layer 11 to the first pole terminal 12. At the same time, current can flow in the capacitor 1, for example, from the second pole terminal 22 via the second voltage layer 21 via the contact-making element 30 via the second terminal 25 to the capacitor structure 3 or current can flow in the reverse direction from the capacitor structure 3 via the second terminal 25, the contact-making element 30 and the second voltage layer 21 to the second pole terminal 22.

Further exemplary embodiments and combinations of the illustrated exemplary embodiments are of course also possible.

The invention claimed is:

1. A capacitor (1) comprising a first voltage layer (11) and a second voltage layer (21), wherein the first voltage layer (11) and the second voltage layer (21) form a region of overlap (4), in which the first voltage layer (11) and the second voltage layer (21) are arranged parallel to one another and directly one above an other, spaced apart from one another by a gap (5), on a base side (6) of the capacitor (1), and at least one capacitor structure (3), which has at least one dielectric (2) and is arranged on an upper side (13) of the first voltage layer (11), said upper side being remote from the second voltage layer (21), wherein the first voltage layer (11) is in electrically conductive contact with a first terminal (15) of the capacitor structure (3), and the second voltage layer (21) is in electrically conductive contact with a second terminal (25) of the capacitor structure (3) via a contact-making element (30), and wherein the first voltage layer (11) has at least one cutout (14), through which the contact-making element (30) has been passed, wherein a flat top region (32) is formed on the contact-making element (30), wherein the capacitor structure (3) is arranged between the flat top region (32) and the first voltage layer (11).

2. The capacitor as claimed in claim 1, characterized in that, apart from the at least one capacitor structure (3), at least one further capacitor structure (3) having a further first terminal (15) and a further second terminal (25) is provided, which at least one further capacitor structure is arranged on the upper side (13) of the first voltage layer (11), wherein the further first terminal (15) of the further capacitor structure (3) is in electrically conductive contact with the first voltage layer (11), and the further second terminal (25) of the further capacitor structure (3) is in electrically conductive contact with the second voltage layer (21) via the contact-making element (30), wherein at least one side region (31) of the contact-making element (30) is arranged at least partially between the at least one capacitor structure (3) and the further capacitor structure (3).

3. The capacitor as claimed in claim 2, characterized in that the at least one side region (31) of the contact-making element (30) is flat.

4. The capacitor as claimed in claim 2, characterized in that the at least one side region (31) of the contact-making element (30) is arranged substantially perpendicular to the first voltage layer (11) and the second voltage layer (21).

5. The capacitor as claimed in claim 1, characterized in that the flat top region (32) of the contact-making element (30) overlaps with the first voltage layer (11) and/or with the second voltage layer (21).

6. The capacitor as claimed in claim 2, characterized in that at least one connecting element (35) is formed on the at least one side region (31), said connecting element protruding through the cutout (14), wherein the connecting element (35) has a smaller width (B35) of the connecting element (35) than a width (B31) of the at least one side region (31).

7. The capacitor as claimed in claim 6, characterized in that a plurality of connecting elements (35) is provided on the at least one side region (31) and a plurality of cutouts is provided in the first voltage layer (11), wherein each one of the plurality of connecting elements (35) protrudes through a respective one of the plurality of cutouts (14) in the first voltage layer (11).

8. The capacitor as claimed in claim 6, characterized in that the at least one connecting element (35) is in the form of a pin and is plugged into at least one opening (27) in the second voltage layer (21) and/or is welded to the second voltage layer (21).

9. The capacitor as claimed in claim 2, characterized in that the contact-making element (30) comprises a further side region (31), wherein the at least one side region (31) and the further side region (31) are arranged on opposite sides (8) of the capacitor structure (3).

10. The capacitor as claimed in claim 1, characterized in that the capacitor (1) comprises at least one first pole terminal (12) for making contact with the first voltage layer (11) and at least one second pole terminal (22) for making contact with the second voltage layer (21), wherein the at least one first pole terminal (12) extends beyond the region of overlap (4) as a lateral continuation of the first voltage layer (11) and, parallel thereto, the at least one second pole terminal (22) extends beyond the region of overlap (4) as a lateral continuation of the second voltage layer (21), and said at least one first pole terminal and said at least one second pole terminal thus form at least one contact-making pair of lugs (7) protruding on the base side (6) of the capacitor (1).

11. The capacitor as claimed in claim 1, characterized in that the first voltage layer (11) completely surrounds the contact-making element (30) peripherally in a region of the cutout (14).

12. The capacitor as claimed in claim 1, wherein the capacitor is an intermediate circuit capacitor for a polyphase system.

* * * * *